United States Patent Office 3,537,944
Patented Nov. 3, 1970

3,537,944
TRANSPARENT HEAT REFLECTING WINDOW HAVING RELATIVELY LOW INTERNAL VISUAL REFLECTION
Albany D. Grubb, Maumee, and Charles M. Browne and Peter H. Berning, Toledo, Ohio, assignors to Libbey-Owens-Ford Glass Company, Toledo, Ohio, a corporation of Ohio
Filed Mar. 17, 1967, Ser. No. 623,978
Int. Cl. B32b 17/06; C03c 17/06; G02b 1/10
U.S. Cl. 161—4    12 Claims

ABSTRACT OF THE DISCLOSURE

Increasing the solar energy reflection from the outboard surface of a glazing unit without either significantly increasing the reflection of incident light from the inboard surface of the unit or detrimentally restricting the Illuminant C transmittance of the unit by first depositing a layer of copper metal on a surface of the unit and then oxidizing a portion of the copper layer to a critical degree such that the Illuminant C transmittance of the filmed surface is in the range of from 15 percent to 45 percent.

BACKGROUND OF THE INVENTION

Field of the invention

This invention relates generally to filmed or coated articles for use in various optical applications and particularly to glazing units provided with a novel thin optical film for modifying the light and solar radiation transmittance properties of the transparent substrate of such units.

Description of the prior art

Many buildings constructed today employ so-called glass curtain walls that comprise relatively narrow metallic frames or skeletons and large sheets or plates of glass. This type of construction offers many advantages, but because of the large window area and the fact that ordinary clear glass is a good transmitter of incident solar energy, buildings using these curtain walls tend to be unbearably hot in the summer. As a result, the buildings require refrigeration plants of unusually large capacity in order to create a satisfactory internal environment. In order to overcome or at least minimize this problem, special composition glasses having heat-absorbing properties have been used in place of clear or regular plate glass. However, while these special glasses have been found to some extent to be effective in decreasing radiation transmittance, the fact remains that since they act to intercept radiation by absorption, their temperature will eventually be increased to a point where they become a radiator with part of the heat going to the inside of the building or other enclosure and part of the heat going to the outside. Moreover, equal distribution of re-radiated heat from heat-absorbing glass would take place only when the conditions outside and inside the building are the same with respect to air temperature and convection and conduction losses.

It also has been proposed to apply to the glass a thin transparent metallic or metallic oxide coating that reflects a far greater portion of the incident solar or radiant energy than the glass itself. This proposal is satisfactory from the standpoint of reducing the refrigeration load but it involves a compromise that limits its usefulness. The nature of this compromise becomes apparent when it is realized that the coating reflects not only incident solar energy but also incident light emanating from sources within the building. The better the coating from the standpoint of a solar energy reflector, the more effective it becomes as an internal mirror. Of course, the glare produced by large mirror-like walls is annoying to the occupants of the building and impairs their view of the outside. Because of this, it is necessary to use a coating having a relatively low internal reflection characteristic since internal and external reflection are directly related. This limitation impairs the effectiveness of the window as a solar energy reflector.

SUMMARY

It has now been discovered, and the present invention is based upon such discovery, that a highly efficient transparent heat reflecting glazing unit may be produced by first applying a layer of metallic copper of a predetermined thickness upon a glass or other transparent substrate and thereafter subjecting this film to the action of an electric glow discharge in the presence of oxygen under certain controlled conditions. It has been found that the correct degree of oxidation will produce an effective film having a differential in light reflectivity from the two surfaces of the substrate that results in an ideal glazing unit structure. For example, copper films laid down on glass sheet substrates in thicknesses in the range of from 300 to 650 angstroms and having an Illuminant C transmittance of from 4 to 25 percent will, when oxidized in accordance with the invention, provide window lites having a total solar energy reflectance from the unfilmed side of from 25 to 65 percent, an Illuminant C reflectance from the copper oxide surface of only 6 to 16 percent and an Illuminant C transmittance in the range of 15 to 45 percent.

It is, therefore, a principal object of this invention to provide an improved film or coating for modifying the optical characteristics of a transparent substrate.

Another object of the invention is the provision of novel transparent heat reflecting glazing units.

More particularly, it is an object of this invention to provide a glazing unit that is an excellent reflector of incident solar energy originating from sources outside the building in which it is employed and a poor reflector of incident light energy originating from sources within the building.

BRIEF DESCRIPTION OF THE DRAWINGS

Other objects and advantages of the invention will become more apparent during the course of the following description when taken in connection with the accompanying drawings.

In the drawings wherein like numerals are employed to designate like parts throughout the same.

DESCRIPTION OF PREFERRED EMBODIMENTS

Generally stated, the novel article in accordance with the invention comprises a transparent sheet, a thin light-modifying optical film adhered to one surface of the sheet comprising a layer of copper metal in contact with the surface and an integral layer of copper oxide covering the copper layer, said filmed sheet having an Illuminant C transmittance in the range of from 15 to 45 percent, and means preventing exposure of said copper-copper oxide film to the atmosphere.

Figure 1:
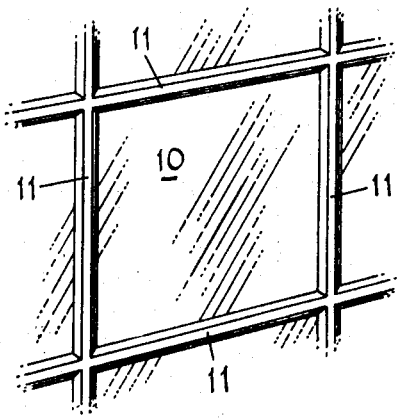
FIG. 1 is a broken perspective view of an installed glazing unit in accordance with the invention.

Referring now more particularly to the drawings, there is illustrated in FIG. 1 a glazing unit in accordance with the invention indicated generally at 10 and shown in its installed position as a portion of a building wall structure. The unit 10, together with several similar adjacent units, are held in place by mullions 11 which may be composed of either wood or metal.

Figure 2:
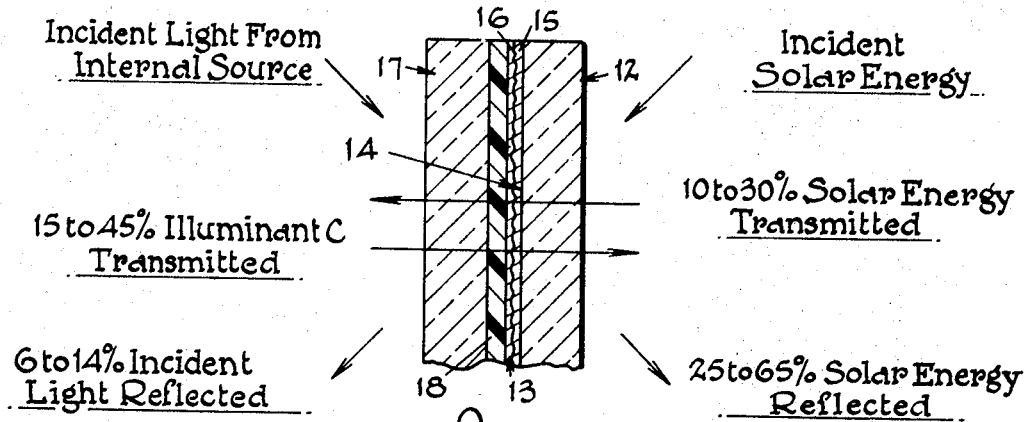
FIG. 2 is a cross sectional view through a laminated glazing unit in accordance with the invention.
Figure 3:
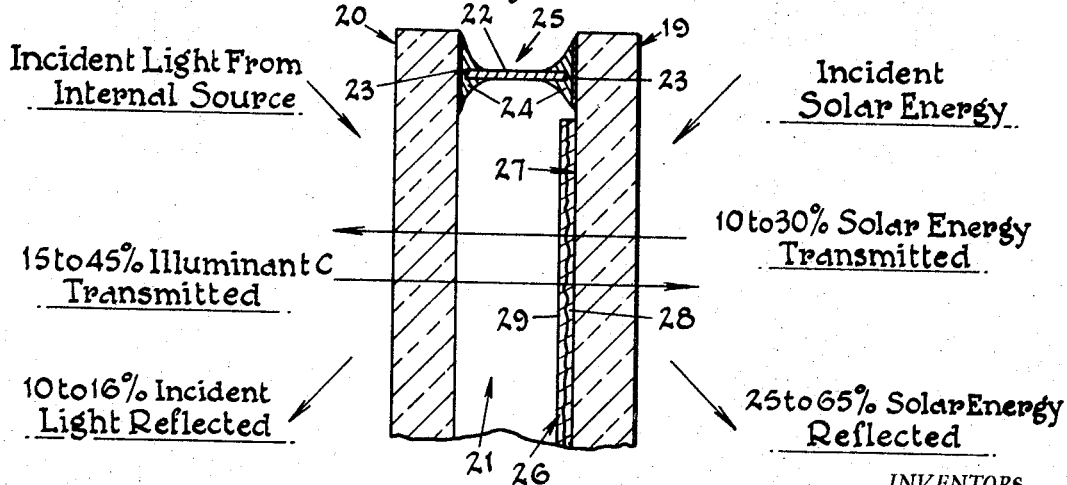
FIG. 3 is a similar cross sectional view of a multiple sheet glazing unit in accordance with the invention.

The glazing unit 10 may comprise either a laminated structure such as shown in FIG. 2 or a multiple sheet structure such as shown in FIG. 3. More particularly, the laminated unit illustrated in FIG. 2 comprises an outboard sheet of glass 12 having a heat reflecting film 13 adhered to its inboard surface 14. The film 13 comprises a layer of copper metal 15 in contact with and adhered to the inboard surface 14 of the sheet 12 and an integral layer of copper oxide 16 completely covering the layer of copper metal. An inboard glass sheet 17 is bonded to the coated surface of the outboard glass sheet 12 by a polyvinyl butyral or other satisfactory transparent plastic material 18. The glass and interlayer bonding material are conventional in the laminated glass art, with the glass preferably being clear or regular plate glass.

The multiple sheet glazing unit illustrated in FIG. 3 comprises an outboard sheet or plate of glass 19 and an inboard sheet 20 arranged in spaced face-to-face relation to provide an air space 21 therebetween. This air space is formed by the provision of suitable separator means such as a metal spacer strip 22 arranged entirely around the marginal edges of the unit and joined to the inner surfaces of the glass sheets 19 and 20 through the intermediary of metallic coatings 23 adherent to the sheets.

Multiple glass sheet glazing units of this general character may be fabricated in accordance with known practices in the art. Briefly stated, the marginal portions of the two glass sheets are provided with tightly adherent metallic coatings 23 upon which is subsequently supplied a layer of solder. A spacer strip 22, formed of lead, or a lead alloy, and suitably coated with a solder layer, is placed on the metallic coating 23 of one of the glass sheets inwardly of the edges thereof. A suitable heating means, such as a soldering iron, is then run along the juncture of the strip 22 and the metallic coating on the glass sheet to melt the solder layers and thus produce fillets 24 along the opposite sides of the strip. As the solder layers amalgamate, the resulting fillets become permanently adherent to the spacer strip and the metallic coating on the glass sheet to establish a hermetic bond therebetween. The first glass sheet, such as the sheet 20, with the strip 22 united therewith is then placed in an inverted position on the second glass sheet, such as the sheet 19, whereupon melting of the solder layers joins the spacer strip to the second glass sheet to provide a multiple glass sheet glazing unit. As shown in FIG. 3, the spacer strip 22 is positioned inwardly of the peripheral edges of the glass sheets to form a channel 25 extending entirely about the unit.

Prior to assembly of the glass sheets, a film 26 in accordance with the invention is provided on the inboard surface 27 of the outboard sheet 19. This film, similar to the film 13, comprises a layer of copper metal 28 in contact with and adhered to the inboard surface 27 and an integral layer of copper oxide 29 completely covering the layer of copper metal.

After the unit has been assembled, air is removed from the space 21 and replaced with a suitable dry inert gas. This is customarily accomplished by inserting hypodermic needles or the like through the strip 22 and thereafter closing the resulting openings with drops of solder. The evacuation and subsequent filling of the air space with an inert gas eliminates as completely as possible any moisture and/or reactive gases, e.g. $O_2$ containing gases, from the sealed air space together with the attendant possibility of condensation on the inboard glass surfaces and further chemical reaction of the copper metal layer as will hereinafter be more fully discussed.

In laying down the films 13 and 26, the glass sheets to which they are to be applied are first thoroughly washed so as to be completely free from grease, dirt and dust, and then dried, with care being taken to prevent any water spotting. The clean sheets are positioned in an airtight coating chamber and heated while the chamber is evacuated. The sheets are then subjected to a glow discharge cleaning process by means of a glow plate or electrode located in the chamber, oxygen being bled into the chamber during this cleaning procedure.

The coating chamber is next pumped down to the desired coating pressure and a layer of copper deposited on the sheets. Preferably, but not necessarily, the copper metal is deposited by vapor deposition with the vapor sources preferred for use employing electron bombardment heating to vaporize the copper metal.

The amount of copper deposited per square area or thickness of the copper layer is critical if one is to obtain the desired optical properties in the unit. In this respect and as previously mentioned, it has been found that copper thicknesses in the range of from 300 to 650 angstroms are necessary to obtain the desired differential in light reflectivity when the coated sheet is assembled in either the laminated or multiple sheet units. The correct thickness may be obtained or established either by the use of a piezoelectric crystal monitor which indicates thickness directly or by the use of an optical monitoring device. In this latter connection, it has been found that a copper layer having an Illuminant C transmittance of from 4 to 25 percent is necessary in this first step of the film application, such transmissions being obtained with the copper layers of from 300 to 650 angstroms thickness.

After the copper metal layer of the desired thickness is deposited, the glow plate is again swung into operative position, oxygen bled into the chamber and the glow plate energized. This is the second critical step of the process in accordance with the invention since it is determinant of the amount of copper film oxidized into copper oxide and thus the resulting final desired optical properties of the coated substrate. In this respect, it should be appreciated that the ion bombardment or glow discharge treatment, in effecting the oxidation of a portion of the copper film, increases the transmittances of the film. Thus, the time of the bombardment determines the thickness of the oxide layer of the film, and while this may vary considerably depending upon the power supplied to the glow plate, the glass temperature and the oxygen pressure, such time is generally in the range of 35 to 75 seconds. However, here again the important control in obtaining the desired film is obtained through the use of the optical monitoring system and is the Illuminant C transmittance of the film. Thus, it has been found that Illuminant C transmittances of the coated sheet of 15 to 45 percent produced, when such sheet is fabricated into either a laminated or multiple sheet glazing unit, the desired optical properties, i.e. the desired differential in reflectivity from the inboard and outboard surfaces of the unit and, accordingly, the glow is terminated when the transmittance is in the aforesaid range.

Multiple sheet and laminated glazing units including as the outboard lite a glass sheet having a $Cu-CuO_x$ film on its inboard surface and an Illuminant C transmittance of from 15 to 45 percent reflect 25 to 60 percent of the incident solar energy striking same while transmitting only 10 to 30 percent thereof. The internal reflectance, that is, the Illuminant C reflectance from the inboard clear lite of either unit is only in the range of 6 to 16 percent, with such reflectance normally being between 6 to 14 percent for the laminated unit and between 10 to 16 for the multiple sheet or double glazed unit. These structures, then, possess excellent properties for use in glazing buildings and the like.

The following examples constitute the best presently known mode for practicing the instant invention.

EXAMPLE I

A 6 inch by 6 inch piece of nominal .125 inch thick ground and polished plate glass was washed with detergent and water and then cleaned with commercial glass cleanser and rubbed with clean cotton cloths. The resulting clean plate glass sample was placed in a vacuum chamber equipped with a high voltage discharge electrode, a glass heater, an electron beam evaporation source including a 10 kw. electron gun, power supply and water cooled carbon crucible, and a Sloan crystal monitoring system such as is commonly used for controlling thickness of films during vacuum deposition thereof. The chamber was next evacuated to a pressure of approximately $2 \times 10^{-6}$ mm. Hg and the glass sample heated to 400° F. during the evacuation. Oxygen was then bled into the chamber until a total pressure of 50 microns was achieved and the plate glass sample further cleaned by ionic bombardment through the application of 1000 volts DC to the glow discharge electrode for 10 minutes. The vacuum chamber was then further evacuated to $1.1 \times 10^{-6}$ mm. Hg and the glass reheated to 350° F.

The vapor source or water cooled carbon crucible which previously had been loaded with an amount of OFHC copper wire was then heated by activation of the electron gun. Deposition of the copper on the glass took place in 48 seconds at a pressure of $1.8 \times 10^{-6}$ mm. Hg with the sample at a coating distance of 23.5 inches. The thickness of the copper film was controlled through the crystal monitor to approximately 420 angstroms or until the optical transmission of the coating was 14 percent at 550 m$\mu$. The electron beam gun was then deactivated.

The glow discharge electrode was then again swung into position, oxygen bled into the chamber until a total pressure of 37 microns was attained and the electrode activated for 45 seconds with the glass sample at a temperature between 350° F. to 300° F. At the end of this period, the Illuminant C transmittance through the glass and Cu-CuO$_x$ film was 42 percent. The high voltage glow discharge electrode together with the glass heater were then deactivated, the filmed glass sample allowed to cool, the pressure in the vacuum chamber raised to atmospheric pressure and the sample removed therefrom. Close visual inspection and handling of the filmed sample showed no cracks or defects in the film.

The filmed sample was then laminated, film side in, with a second 6 inch by 6 inch plate glass sheet .125 inch in thickness through the intermediary of a .030 inch thick sheet of polyvinyl butyral. Spectral reflectance curves from both sides and a transmittance curve from 0.3 to 2.2 microns were run thereon. The following table sets forth the data obtained.

TABLE I

Illuminant C

| | Percent |
|---|---|
| Transmittance | 41 |
| Reflection—Inboard surface, inboard sheet [1] | 8 |
| Reflection—Outboard surface, outboard sheet [2] | -- |

Total solar radiation

| | |
|---|---|
| Transmittance | 29 |
| Reflection—Inboard surface, inboard sheet | -- |
| Reflection—Outboard surface, outboard sheet | 29 |

[1] The inboard sheet is the uncoated sheet and its free surface (not laminated) the inboard surface thereof.
[2] The outboard sheet is the coated sheet and its free surface the outboard surface therein. The inboard surface of this sheet is the filmed surface and it is in contact with the interlayer.

These results may be compared to a glazing comprising two uncoated .125 inch thick plate glass sheets laminated through a .030 inch thick polyvinyl butyral interlayer, which unit has an Illuminant C transmittance of about 89 percent, an Illuminant C reflection from either free surface of about 8 percent, and a total solar radiation reflectance from either free surface of approximately 7 percent.

EXAMPLE II

A 6 inch by 6 inch piece of nominal .125 inch thick ground and polished plate glass was cleaned in the same manner and under the same conditions defined in Example I. After the glow discharge cleaning, the vacuum chamber was further evacuated to $1.3 \times 10^{-6}$ mm. Hg and the glass reheated to 350° F.

The carbon crucible vapor source which was filled with OFHC copper wire was heated by activation of the electron gun. Deposition of the copper on the glass took place in 61 seconds at a pressure of $2.7 \times 10^{-6}$ mm. Hg with the sample at a coating distance of 23.5 inches. The thickness of the copper film was controlled through the crystal monitor to approximately 600 angstroms or until the optical transmittance of the coating was 5 percent at 550 m$\mu$. The electron gun was then deactivated.

The glow discharge electrode was next swung into position, oxygen bled into the chamber to a total pressure of 40 microns and the elecrode activated for 66 seconds with the glass sample at a temperature between 340° F. and 325° F. At the end of this period, the sample had an Illuminant C transmittance through the glass and Cu-CuO$_x$ film of 21 percent. The high voltage glow discharge electrode together with the glass heater were then deactivated, the filmed glass sample allowed to cool, the pressure in the vacuum chamber raised to atmospheric pressure and the sample removed. Close visual inspection and handling of the filmed sample showed no cracks or defects in the film.

The filmed sheet together with an unfilmed 6 inch by 6 inch nominal .125 inch thick ground and polished plate glass was then incorporated into a multiple glass unit such as illustrated in FIG. 3 by the method hereinbefore described. The 5/32 inch air space between the sheets was evacuated and filled with dry nitrogen. Spectral reflectance curves from both sides and a transmittance curve from 0.3 to 2.2 microns were run thereon. The results of these are set forth in Table II below.

TABLE II

Illuminant C

| | Percent |
|---|---|
| Transmittance | 19 |
| Reflection—Inboard surface, inboard sheet | 14 |
| Reflection—Outboard surface, outboard sheet | -- |

Total solar radiation

| | |
|---|---|
| Transmittance | 11 |
| Reflection—Outboard surface, outboard sheet | -- |
| Reflection—Outboard surface, outboard sheet | 57 |

These results may be compared to a similar double glazing unit comprised of two unfilmed glass sheets of the same thickness, which unit has an Illuminant C transmittance of about 82 percent, an Illuminant C reflection from either outwardly facing glass surface of about 15 percent, and a total solar radiation reflectance from either outwardly facing glass surface of approximately 13 percent.

EXAMPLE III

A further laminated unit in accordance with the invention was constructed from two 6 inch by 6 inch pieces of nominal .125 inch thick plate glass sheets and a .030 inch thick polyvinyl butyral interlayer. One of the glass sheets was provided with a Cu-CuO$_x$ film in the following manner. The sheet was first cleaned under the same conditions described in Example I. After the glow discharge cleaning, the vacuum chamber was evacuated to $1.2 \times 10^{-6}$ mm. Hg and the glass reheated to 350° F.

The carbon crucible vapor source which contained a quantity of OFHC copper wire was heated by activation of the electron gun. Deposition of the copper on the glass took place in 72 seconds at a pressure of $2.6 \times 10^{-6}$ mm. Hg with the glass at a coating distance of 23.5 inches. The thickness of the copper film was controlled through the crystal monitor to approximately 600 angstroms or until the optical transmittance of the coating was 5 percent at 550 m$\mu$. The electron gun was then deactivated.

The glow discharge electrode was next swung into position, oxygen bled into the chamber to a total pressure of 35 microns and the electrode activated for 47 seconds with the glass sample at a temperature of 340° F.

At the end of this period, the sample had an Illuminant C transmittance through the glass and Cu-CuO$_x$ film of 22 percent.

After lamination of the filmed sheet, spectral reflectance curves from both sides and a transmittance curve from 0.3 to 2.2 microns were run on the laminate. The following table sets forth the data obtained.

TABLE III

Illuminant C

|  | Percent |
|---|---|
| Transmittance | 24 |
| Reflection—Inboard surface, inboard sheet | 11 |
| Reflection—Outboard surface, outboard sheet | -- |
| Total solar radiation | |
| Transmittance | 16 |
| Reflection—Inboard surface, inboard sheet | -- |
| Reflection—Outboard surface, outboard sheet | 54 |

EXAMPLE IV

A further double glazed unit in accordance with the invention was constructed from two 6 inch by 6 inch pieces of nominal .125 inch thick plate glass sheets having a 5/32 inch air space therebetween filled with dry nitrogen. One of the glass sheets was provided with a Cu-CuO$_x$ film on its surface bounding the air gap in the manner now to be described. The sheet was first cleaned under the same conditions recited in Example I. After the glow discharge cleaning step, the vacuum chamber was evacuated to $1.3 \times 10^{-6}$ mm. Hg and the glass reheated to 350° F.

The carbon crucible vapor source which contained a quantity of OFHC copper wire was heated by activation of the electron gun. Deposition of the copper on the glass took place in 50 seconds at a pressure of $2.4 \times 10^{-6}$ mm. Hg with the glass at a coating distance of 23.5 inches. The thickness of the copper film was controlled through the use of the crystal monitor to approximately 420 angstroms or until the transmittance of the coating was 14 percent at 550 m$\mu$. The electron gun was then deactivated.

The glow discharge electrode was next swung into position, oxygen bled into the chamber to a total pressure of 34 microns and the electrode activated for 42 seconds with the glass sheet at a temperature of 350° F. to 330° F. At the end of this period, the sample had an Illuminant C transmittance through the glass and Cu-CuO$_x$ film of 40 percent.

After fabrication of the filmed sheet into a double glazed unit, spectral reflectance curves from both sides and a transmittance curve from 0.3 to 2.2 microns were run on the laminate. The results of these tests are set forth in the table below.

TABLE IV

Illuminant C

|  | Percent |
|---|---|
| Transmittance | 38 |
| Reflection—Inboard surface, inboard sheet | 14 |
| Reflection—Outboard surface, outboard sheet | -- |
| Total solar raditaion | |
| Transmittance | 25 |
| Reflection—Inboard surface, inboard sheet | -- |
| Reflection—Outboard surface, outboard sheet | 35 |

As previously mentioned, the films in accordance with the invention must be protected from the atmosphere or other media which will cause chemical change therein. Thus, exposure of the film to the air or other oxygen containing gases may cause further oxidation of the copper metal layer which in turn adversely effects the optical properties of the film, i.e. greatly increases the transmittance of solar energy therethrough. The laminated and multiple sheet glazing units herein described, of course, provide complete protection in this regard but the invention is not limited to units of these types. For example, a protective layer or lamina of SiO$_2$, Al$_2$O$_3$, MgF$_2$ or the like in thicknesses up to a mil may be utilized and applied over the copper oxide layer to afford this protection.

The copper metal layer and not the copper oxide layer must, in all glazing units in accordance with the invention, be positioned to intercept first the incident solar energy, i.e. be located on the inboard surface of the outboard glass sheet of the unit in contact with the glass. Thus, it is the copper that provides the excellent solar radiation reflectance property of the units while the copper oxide layer enables the low incident light reflection from internal sources.

As would be expected, the inboard appearance of the Cu-CuO$_x$ film is noticeably colored, although it is not so harsh as to be displeasing to the eye. Coloration can be varied from reddish-yellow hues through magenta to blue tones by controlling the extent of oxidation in the glow discharge treatment of the copper film—the blue color corresponding to the greatest amount of oxidation. Resulting Illuminant C transmittances corresponding to an initial deposited thickness of copper will, of course, depend upon the extent of oxidation employed. Hence, the inboard color can be compensated for at the outset by adjusting the copper thickness up or down as the case may be. In the examples set forth above, the inboard colors were of a bluish hue.

Finally, while it is possible to promote oxidation of the copper metal layer by various means, for example, by heating in air to temperatures in the range of 300 to 500° F. or higher, the resulting film does not seem to exhibit the same desired excellent optical properties obtained through the use of glow discharge oxidation. It appears that the ion bombardment resulting from glow discharge oxidation produces greater uniformity in the copper oxide layer, and a more compact, denser film which better withstands exposure to the elements. In addition, oxidation through the use of an electric glow discharge is more easily and accurately controlled which is an extremely important consideration in obtaining the desired critical optical properties in the glazing unit.

While what has been described is considered to be the most advantageous embodiments of the invention, it will be apparent that modifications and variations can be made in the compositions and specific procedures discussed without departing from the spirit and scope of the present invention, as those skilled in the art will readily understand.

We claim:

1. A unit adapted for glazing a window opening comprising two spaced transparent sheets disposed face-to-face in substantially parallel relationship, one of said sheets forming the outboard sheet of the unit, a thin optical film for modifying the solar radiation transmittance of said unit adhered to the inwardly disposed surface of said outboard sheet comprising a layer of copper metal formed on and in contact with said surface and an integral layer of copper oxide over and covering said copper layer, said filmed sheet having an Illuminant C transmittance in the range of from 15 percent to 45 percent, and means preventing exposure of said copper-copper oxide film to the atmosphere.

2. A unit adapted for glazing a window opening comprising a parent sheet, one surface of which forms the outboard surface of the unit and the other the inboard surface thereof, a thin optical film for modifying the solar radiation transmittance of said unit adhered to the inboard surface of said sheet comprising a layer of copper metal formed on and in contact with said inboard surface and an integral layer of copper oxide over and covering said copper layer, said filmed sheet having an Illuminant C transmittance in the range of from 15 percent to 45 percent, and a transparent lamina adjacent said copper-copper oxide film effective to prevent exposure of said film to the atmosphere.

3. A multiple sheet glazing unit, comprising two sheets of glass held in spaced face-to-face relation by separator means disposed around the edges thereof to form a closed air space therebetween, one of said sheets forming the outboard sheet of the unit, an atmosphere of a dry gas filling said air space, and a thin partially transparent optical film adhered to the inwardly disposed surface of said outboard glass sheet, said film comprising a layer of copper metal formed on and in contact with said inwardly disposed surface and an integral layer of copper oxide over and covering said copper layer, said filmed glass sheet having an Illuminant C light transmittance in the range of from 15 to 45 percent.

4. A multiple sheet glazing unit as defined in claim 3, wherein said gas consists essentially of nitrogen.

5. A multiple sheet glazing unit as defined in claim 3, wherein the total solar energy reflectance from the outwardly disposed surface of the coated sheet is in the range of from 25 percent to 65 percent, and the Illuminant C reflectance from the outwardly disposed surface of the uncoated sheet is in the range of from 10 percent to 16 percent.

6. A laminated glazing unit, comprising two sheets of glass bonded together through and interposed transparent sheet of plastic material, one of said sheets forming the outboard sheet of the unit, and a thin partially transparent optical film adhered to the inwardly disposed surface of said outboard glass sheet and contacting said interposed plastic layer, said film comprising a layer of copper metal formed on and in contact with said inwardly disposed glass surface and an integral layer of copper oxide over and covering said copper layer, said filmed glass sheet having an Illuminant C light transmittance in the range of from 15 to 45 percent.

7. A laminated glass glazing unit as defined in claim 6, wherein said interposed plastic layer is polyvinyl butyral resin.

8. A laminated glass glazing unit as defined in claim 6, wherein the total solar energy reflectance from the outwardly disposed surface of the coated sheet is in the range of from 25 percent to 65 percent, and the Illuminant C reflectance from the outwardly disposed surface of the uncoated sheet is in the range of from 6 percent to 14 percent.

9. In the manufacture of an architectural glazing unit including a transparent sheet, one surface of which forms the outboard surface of the unit and the other the inboard surface thereof, the method comprising applying to the inboard surface of said sheet a layer of copper metal of a thickness in the range of 300 to 650 angstroms, subjecting said copper layer to an electric glow discharge in the presence of oxygen to form a layer of copper oxide upon said copper metal layer integral therewith, continuing the glow discharge treatment until the Illuminant C transmittance of said transparent sheet and adhered copper-copper oxide film is in the range of from 15 to 45 percent, and locating a transparent lamina adjacent said copper-copper oxide film effective to prevent exposure of said film to the atmosphere.

10. In the manufacture of a multiple transparent sheet glazing unit, in which one of said sheets forms the outboard sheet of the unit, the method comprising applying to the inboard surface of said outboard sheet a layer of copper metal of a thickness in the range of 300 to 650 angstroms, subjecting said copper layer to an electric glow discharge in the presence of oxygen to form a layer of copper oxide upon said copper metal layer integral therewith, continuing the glow discharge treatment until the Illuminant C transmittance of said transparent sheet and adhered copper-copper oxide film is in the range of from 15 to 45 percent, assembling a second transparent sheet in face-to-face substantially parallel relationship with said outboard sheet with the filmed surface of the outboard sheet facing said second sheet, and joining said sheets together so as to prevent contact of said copper-copper oxide film with the atmosphere.

11. A method as defined in claim 10, wherein said layer of copper metal is deposited by vacuum deposition.

12. In the manufacture of an architectural glazing unit including two glass sheets, one of which forms the outboard sheet of the unit, the method comprising applying to one surface of said outboard glass sheet a layer of copper metal in a thickness sufficient that such coated sheet has an Illuminant C light transmittance in the range of from 4 percent to 25 percent, subjecting said copper layer to an electric glow discharge in the presence of oxygen to form a layer of copper oxide upon said copper metal layer integral therewith, continuing the glow discharge treatment until the Illuminant C transmittance of said glass sheet and adhered copper-copper oxide film is in the range of from 15 to 45 percent, assembling a second transparent glass sheet in face-to-face substantially parallel relationship with said outboard sheet with the filmed surface of the outboard sheet facing said second sheet, and joining said glass sheets together so as to prevent contact of said copper-copper oxide film with the atmosphere.

References Cited

UNITED STATES PATENTS

| | | | |
|---|---|---|---|
| 2,628,927 | 2/1953 | Colbert et al. | 161—225 X |
| 2,675,740 | 4/1954 | Barkley | 117—124 X |
| 2,756,467 | 7/1956 | Etling | 161—45 |

FOREIGN PATENTS 971,131 9/1964 Great Britain.

JOHN T. GOOLKASIAN, Primary Examiner

R. A. KILLWORTH, Assistant Examiner

U.S. Cl. X.R.

117—35, 71, 107, 124; 161—45, 196, 199, 225; 350—1, 259, 276

PO-1050
(5/69)

UNITED STATES PATENT OFFICE
CERTIFICATE OF CORRECTION

Patent No. 3,537,944　　　　　　　　　Dated November 3, 1970

Inventor(s) Albany D. Grubb et al

It is certified that error appears in the above-identified patent and that said Letters Patent are hereby corrected as shown below:

Col. 6, line 42, cancel "outboard" (both instances) and insert --inboard--.

Col. 8, line 62, cancel "parent" and insert --transparent--

SIGNED AND
SEALED
DEC 29 1970

(SEAL)
Attest:

Edward M. Fletcher, Jr.
Attesting Officer

WILLIAM E. SCHUYLER, JR.
Commissioner of Patents